United States Patent [19]
Yang

[11] Patent Number: 5,325,876
[45] Date of Patent: Jul. 5, 1994

[54] ASHTRAY WITH OZONE GENERATOR AND CATALYTIC EXCHANGER

[76] Inventor: Tsung-Hsun Yang, No. 167, Yung-Feng Rd., Tai-Ping Hsiang, Taichung Hsien, Taiwan

[21] Appl. No.: 231

[22] Filed: Jan. 4, 1993

[51] Int. Cl.⁵ .............................. A24F 19/00
[52] U.S. Cl. .................... 131/242; 55/385.8; 131/231
[58] Field of Search ........ 131/231, 240.1, 242, 131/241; 55/385.8, 385.1–385.4, 279, 316, 318; 422/4, 186.07, 186.1, 169

[56] References Cited

U.S. PATENT DOCUMENTS

| | | | |
|---|---|---|---|
| 3,966,442 | 6/1976 | Waters | 131/231 X |
| 4,052,179 | 10/1977 | Kirk | 131/242 X |
| 4,148,618 | 4/1979 | Christenson et al. | 131/231 X |
| 4,154,251 | 5/1979 | Doyel | 131/231 |
| 4,161,181 | 7/1979 | Nicks et al. | 131/231 |
| 4,580,582 | 4/1986 | Grube et al. | 131/231 |
| 4,671,300 | 6/1987 | Grube et al. | 131/231 |
| 4,828,165 | 5/1989 | Watai et al. | 131/231 X |
| 4,904,289 | 2/1990 | Miyakami et al. | |
| 4,996,995 | 3/1991 | Kojima | 131/231 X |

Primary Examiner—Jennifer Doyle
Attorney, Agent, or Firm—Ladas & Parry

[57] ABSTRACT

The ash tray includes a device for filtering the nicotine in the cigarette smoke and for changing the cigarette smoke into a harmless gas. The device includes a catalytic exchanger, an ozone generator, a fan, a transformer and a filter enclosed within an enclosure including a base plate and a bowl-shaped cover member.

2 Claims, 5 Drawing Sheets

ASHTRAY WITH OZONE GENERATOR AND CATALYTIC EXCHANGER

BACKGROUND OF THE INVENTION

1. Field of the Invention

This invention relates to an ash tray, more particularly to an ash tray for receiving cigarette ash and which includes a means for transforming the cigarette smoke into a harmless gas.

2. Description of the Related Art

Referring to FIG. 1, a conventional ash tray is shown to comprise a circular plate (2) which defines a recess (3) at a central portion thereof for receiving ash from a cigarette (1) therein. It is well known that the cigarette smoke produced by the cigarette (1) contains nicotine and carbon monoxide which can affect the health of a person when inhaled.

SUMMARY OF THE INVENTION

Therefore, the main objective of the present invention is to provide an ash tray which includes means for filtering the nicotine content in the cigarette smoke and for converting the cigarette smoke into a harmless gas.

Accordingly, an ash tray of the present invention includes an enclosure that has a base plate with a top surface which defines a recess at a central portion and which has a plurality of grooves formed thereon. The grooves extend from the periphery of the base plate to the recess. The enclosure further has an inverted bowl-shaped cover member that has a lower portion provided with a plurality of notches along the periphery and connected to the periphery of the base plate. The cover member and the base plate cooperatively confine a hollow space therebetween. The cover member has a topmost portion that is provided with a through-hole which communicates the hollow space and an exterior of the enclosure. A pair of holding members is fixed on opposite sides of an inner wall surface of the cover member. A catalytic exchanger is provided detachably between the holding members adjacent to the through-hole of the cover member. An ozone generating device is provided detachably between the holding members below the catalytic exchanger. An exhaust fan unit is provided detachably between the holding members below the ozone generating device and is capable of drawing air from beneath so as to cause the air to the ozone generating device. A filtering device is provided detachably between the holding members below the exhaust fan unit and is made of wool fiber. The filtering device absorbs nicotine content in the cigarette smoke. A transformer is mounted on a lowermost portion of one of the holding members and is connected electrically to the ozone generating device.

BRIEF DESCRIPTION OF THE DRAWINGS

Other features and advantages of the present invention will become more apparent in the following detailed description of the preferred embodiment with reference to the accompanying drawings, in which.

DETAILED DESCRIPTION OF THE PREFERRED EMBODIMENT

Figure 1:
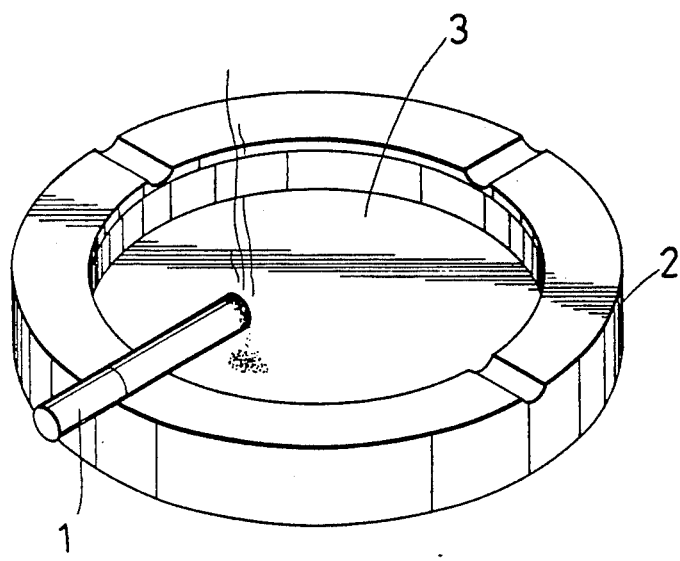
FIG. 1 is a perspective view of a conventional ash tray.
Figure 2:
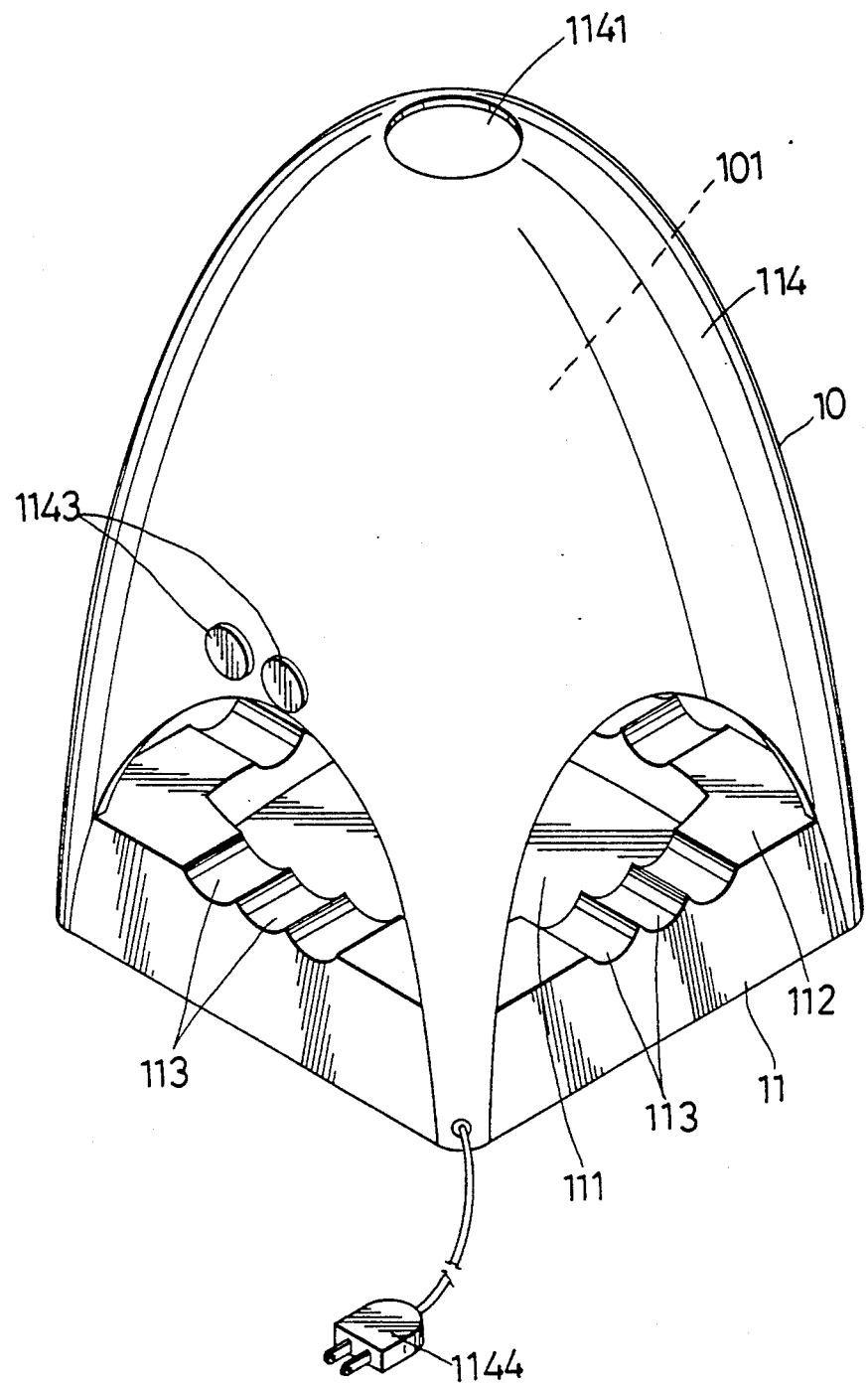
FIG. 2 is a perspective view of an ash tray of the present invention.
Figure 3:
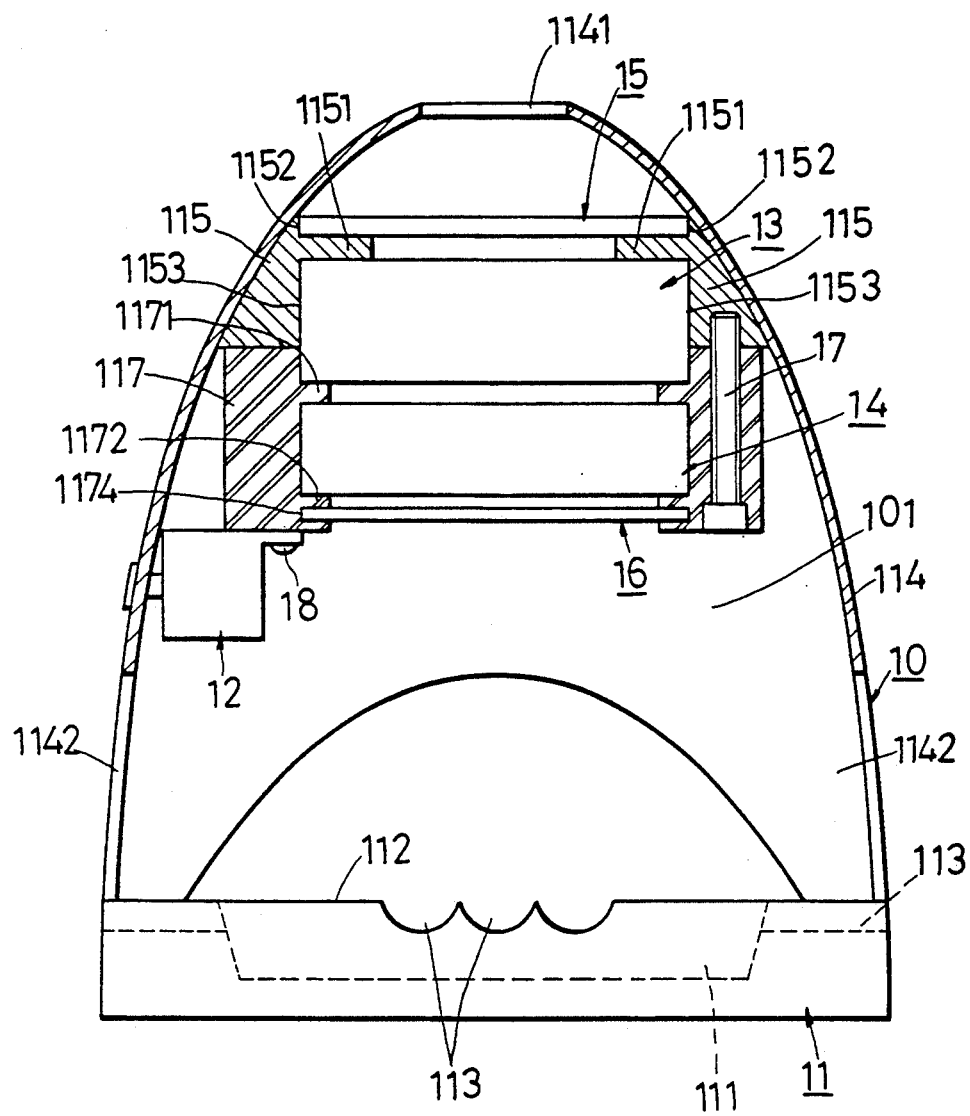
FIG. 3 is a cross-sectional view of the ash tray according to the present invention.
Figure 4:
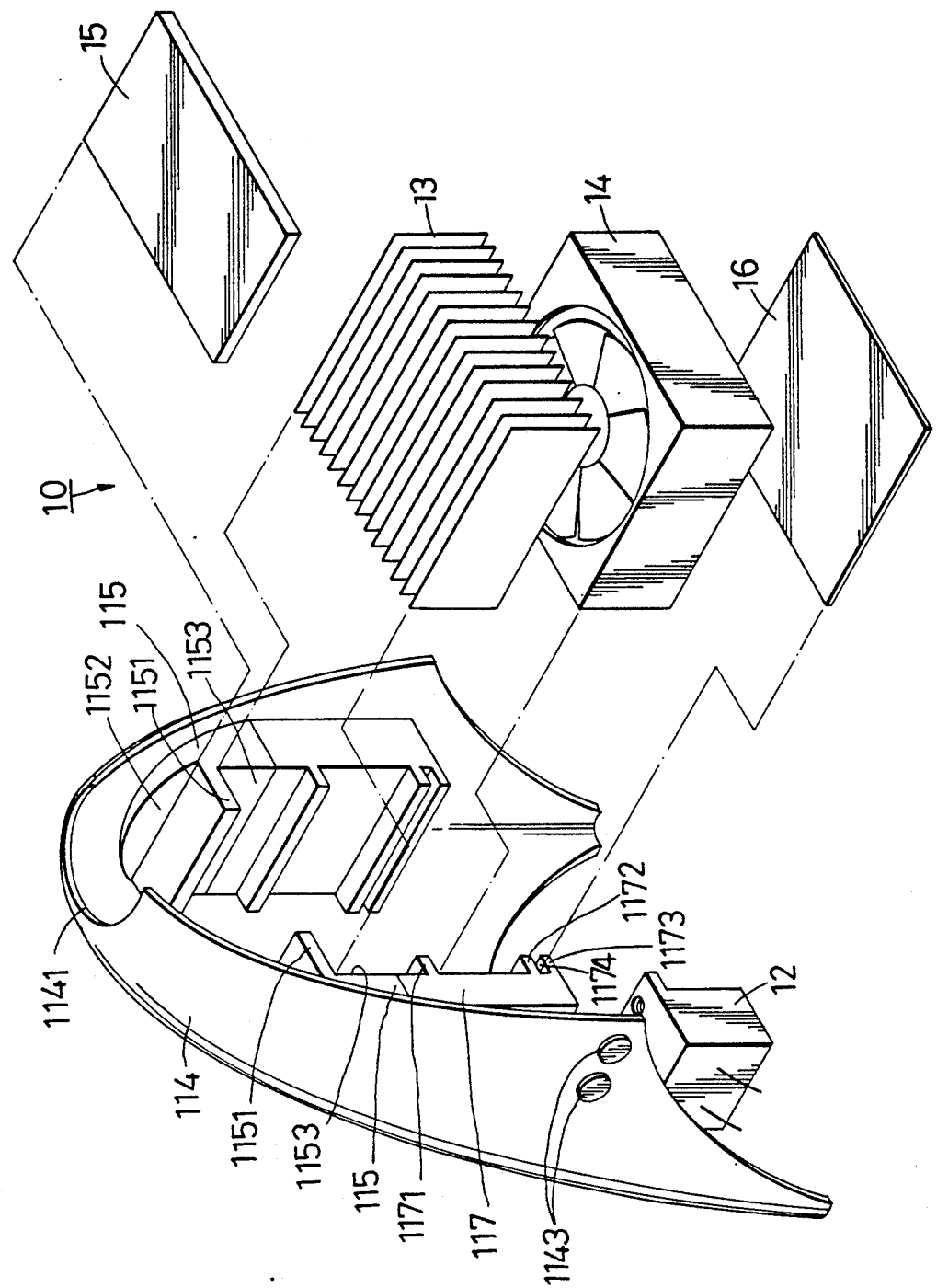
FIG. 4 shows an exploded view of the ash tray of the present invention.
Figure 5:
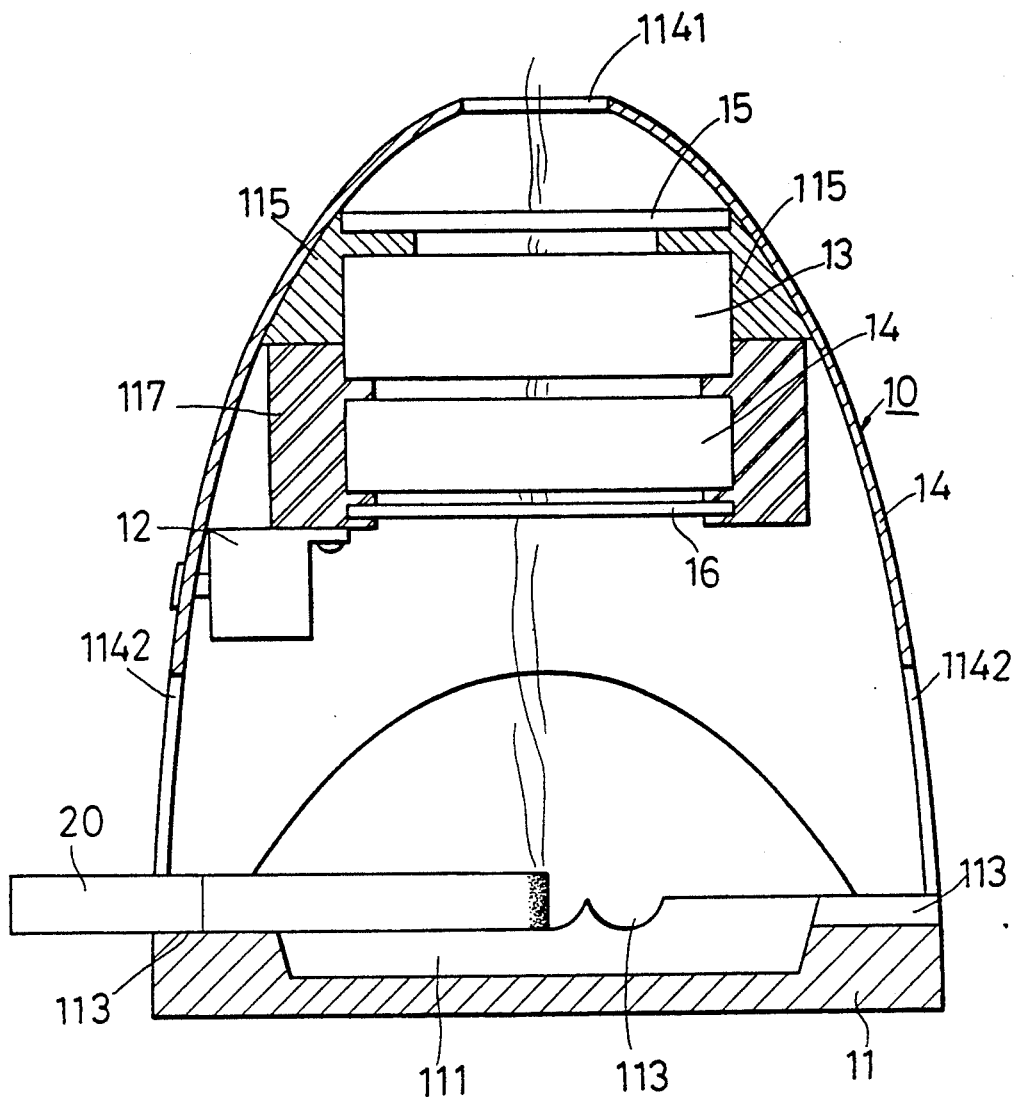
FIG. 5 is another cross-sectional view of the ash tray of the present invention illustrating the latter when in use.

Referring to FIGS. 2 and 3, an ash tray according to the present invention comprises an enclosure (10) that includes a rectangular base plate (11) which has a top surface that is provided with a rectangular recess (111) and a plurality of grooves (113) that extend from the periphery of the base plate (11) to the recess (111). The enclosure (10) further includes an inverted bowl-shaped cover member (114) that has a lower portion provided with four curved notches (1142) along the periphery of the lower portion and connected to the periphery of the base plate (11). The base plate (11) and the cover member (114) cooperatively confine a hollow space (101) therebetween so as to accommodate a plurality of elements that distinguish the ash tray of the present invention from the prior art.

The cover member (114) has a topmost portion that is provided with a through-hole (1141) which communicates the hollow space (101) and an exterior of the enclosure (10). A set of holding members (115) is fixed on opposite sides of an inner wall surface of the cover member (114). Each of the holding members (115) has a first projection (1151) that extends inwardly therefrom and that defines two upright walls (1152, 1153) at upper and lower portions thereof. A catalytic exchanger (15) is provided on the first projections (1151) and is held between the two upright walls (1152). A set of fixing members (117) is secured to the holding member (115) by means of screws (17). Second and third pairs of projections (1171, 1172) extend inwardly from the fixing members (117) such that the first and second projections (1151, 1171) and the upright wall (115) cooperatively define a first receptacle thereamong, and the second and third projections (1171, 1172) and the fixing members (117) cooperatively define a second receptacle thereamong. Each of the third projections (1172) has an elongated groove (1174) formed along the periphery to receive a filtering device (16) which is made of wool fiber.

An ozone generating device (13) is provided in the first receptacle. An exhaust fan unit (14) is provided in the second receptacle and is capable of drawing air from beneath, thus permitting the air to flow into the ozone generating device when in operation. The construction of the ozone generating device (13) is known in the art and will not be detailed herein.

A voltage transformer (12) is mounted in the fixing member (117) by means of a screw (18) and includes a power switch. The transformer (12) is connected electrically to the ozone generating device (13) and supplies a high voltage to the latter when in operation.

The enclosure (10) further includes a plug (114) which is connected electrically to the ozone generating device (13) and to the exhaust fan unit (14). When the plug (114) is connected to the main power source and the power switch of the transformer (12) is turned on, the ozone generating device (13) receives a high voltage so that the following chemical reactions can take place:

$$CO + O_3 \rightarrow CO_2 + O_2$$

From the above chemical equation, the carbon monoxide from the burning cigarette (20) combines with the ozone which is produced by the ozone generating device (13) and is changed into carbon dioxide. The excess ozone is converted into oxygen with the aid of the catalytic exchanger (15).

Nicotine which is a poisonous and oily substance in the cigarette smoke, is first absorbed by the wool-fiber filtering member (16) disposed below the exhaust fan unit (14). The cigarette smoke at the lower portion of the enclosure (10) is drawn upward and flown into the ozone generating device (13) when the exhaust fan unit (14) is operated.

It has been shown that the nicotine and carbon monoxide in the cigarette smoke can be removed with the aid of the ash tray of the present invention. The features and objectives of the present invention are therefore attained.

While a preferred embodiment has been described and illustrated, it will be apparent that many changes and modifications can be made in the general construction and arrangement of the present invention without departing from the scope and spirit thereof. Therefore, it is desired that the present invention be not limited to the exact disclosure but only to the extent of the appended claims.

I claim:

1. An ash tray comprising:

an enclosure including a base plate with a top surface which has a central recess and a plurality of grooves that extend from the periphery of said base plate to said central recess, and an inverted bowl-shaped cover member having a lower portion provided with a plurality of notches along the periphery of said lower portion and connected to the periphery of said base plate, said cover member and said base plate cooperatively confining a hollow space therebetween, said notches communicating said hollow space and an exterior of said enclosure, said cover member further having a topmost portion provided with a through-hole which communicates said hollow space and the exterior of said enclosure;

a pair of holding members fixed on opposite sides of an inner wall surface of said cover member;

a catalytic exchanger member provided detachably between said pair of holding members adjacent to said through-hole;

an ozone generating device provided detachably between said holding members below said catalytic exchanger;

an exhaust fan unit provided detachably between said holding members below said ozone generating device and capable of drawing air to pass through said ozone generating device; and a transformer mounted on a lowermost portion of one of said holding members and connected electrically to said ozone generating device for providing a high voltage to said ozone generating device to facilitate production of ozone gas.

2. The astray as defined in claim 1, wherein said enclosure is further provided with a filter device disposed below said exhaust fan unit and made of wool fiber.

* * * * *